US012659931B2

(12) United States Patent
    Droste

(10) Patent No.: US 12,659,931 B2
(45) Date of Patent: Jun. 16, 2026

(54) LATENCY REDUCTION SYSTEM

(71) Applicant: GM Global Technology Operations LLC, Detroit, MI (US)

(72) Inventor: Scott Thomas Droste, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 331 days.

(21) Appl. No.: 18/487,078

(22) Filed: Oct. 14, 2023

(65) Prior Publication Data

US 2025/0126602 A1     Apr. 17, 2025

(51) Int. Cl.
    *H04W 68/02*        (2009.01)
    *G07C 5/08*         (2006.01)
(52) U.S. Cl.
    CPC .............. *H04W 68/02* (2013.01); *G07C 5/08* (2013.01)
(58) Field of Classification Search
    CPC ................................. H04W 68/02; G07C 5/08
    USPC ......................................................... 455/458
    See application file for complete search history.

(56) References Cited

U.S. PATENT DOCUMENTS

| 2005/0143146 | A1 | 6/2005 | Kim | |
| 2024/0206007 | A1* | 6/2024 | Wirtanen | H04W 4/40 |

FOREIGN PATENT DOCUMENTS

| EP | 3255933 A1 | 12/2017 |

* cited by examiner

*Primary Examiner* — Joel Ajayi
(74) *Attorney, Agent, or Firm* — Honigman LLP; Matthew H. Szalach; Jonathan P. O'Brien

(57)        ABSTRACT

A latency reduction system for a vehicle is disclosed. The latency reduction system includes a vehicle processor for storing vehicle data including ignition status. The latency reduction system also includes a user device communicatively coupled to the vehicle processor and including data processing hardware storing a first predetermined paging latency time interval. Additionally, the latency reduction system includes a server communicatively coupled to the vehicle processor and the user device and configured to change the first predetermined paging latency time interval to a second predetermined paging latency time interval based on the ignition status.

12 Claims, 4 Drawing Sheets

LATENCY REDUCTION SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against present disclosure.

The present disclosure relates generally to a latency reduction system.

Cellular communications are used for various purposes. Cellular networks, such as 4G/5G cellular networks constantly receive new data to the core cellular network from which various devices can connect to have access to this data. Sometimes, new data is pegged for a specific wireless device.

Current cellular networks are programed with an inherent delay between the time new data destined to a wireless device arrives within the core cellular network and the time that the wireless device is available for receiving communication from the core cellular network. This delay may prevent critical information from reaching the wireless device in a time sufficient manner. Therefore, there remains a need for reducing this inherent delay under certain conditions.

SUMMARY

A latency reduction system for a vehicle is provided and includes a latency reduction module receiving vehicle data including ignition status and a vehicle telematics unit communicatively coupled to the latency reduction module and including memory hardware storing a first predetermined paging latency time interval and a second predetermined paging latency time interval, the latency reduction module configured to instruct the vehicle telematics unit to switch between the first predetermined paging latency time interval and the second predetermined paging latency time interval based on the ignition status.

The latency reduction system may include one or more of the following optional features. For example, when the ignition status is changed from an OFF state to an ON state, the first predetermined paging latency time interval may be changed to the second predetermined paging latency time interval. In some examples, when the ignition state is changed from an ON state to an OFF state, the second predetermined paging latency time interval is returned to the first predetermined paging latency time interval. In some examples, the first predetermined paging latency time interval is approximately 1.28 seconds. In some examples, the second predetermined paging latency time interval is less than approximately 1.28 seconds. In some examples, the second predetermined paging latency time interval is less than approximately 1.0 seconds. In some examples, the second predetermined paging latency time interval is less than approximately 0.75 seconds.

In another configuration, a latency reduction system for a vehicle is provided and includes a latency reduction module receiving vehicle data including ignition status and a vehicle telematics unit communicatively coupled to the latency reduction module and including memory hardware storing a first predetermined paging latency time interval and a second predetermined paging latency time interval, the latency reduction module configured to switch from the first predetermined paging latency time interval to the second predetermined paging latency time interval when the ignition status changes from an OFF state to an ON state and the latency reduction module configured to switch from the second predetermined paging latency time interval to the first predetermined paging latency time interval when the ignition status changes from the ON state to the OFF state.

The latency reduction system may include one or more of the following optional features. For example, the second predetermined paging latency time interval may be shorter than the first predetermined paging latency time interval.

In some examples, the first predetermined paging latency time interval is approximately 1.28 seconds or greater. In some examples, the second predetermined paging latency time interval is less than approximately 1.0 seconds. In some examples, the second predetermined paging latency time interval is less than approximately 0.75 seconds.

A body control module may be in communication with the latency reduction module, the body control module configured to provide the latency reduction module with the ignition status.

A vehicle may incorporate the latency reduction system described above.

In yet another example, a latency reduction system for a vehicle is provided and includes a latency reduction module receiving vehicle data including ignition status and a vehicle telematics unit communicatively coupled to the latency reduction module and including memory hardware storing a first predetermined paging latency time interval and a second predetermined paging latency time interval, the latency reduction module configured to instruct the vehicle telematics unit to switch between the first predetermined paging latency time interval and the second predetermined paging latency time interval based on a time elapsed since the last change in the ignition status.

The latency reduction system may include one or more of the following optional features. For example, the second predetermined paging latency time interval may be shorter than the first predetermined paging latency time interval. In some examples, when the ignition status is changed from an OFF state to an ON state, the first predetermined paging latency time interval is changed to the second predetermined paging latency time interval. In some examples, when the ignition state is changed from an ON state to an OFF state, the second predetermined paging latency time interval remains for a predetermined time and then is returned to the first predetermining paging latency time interval. In some examples, the second predetermined paging latency time interval is less than approximately 1.28 seconds.

BRIEF DESCRIPTION OF THE DRAWINGS

The drawings described herein are for illustrative purposes only of selected configurations and are not intended to limit the scope of the present disclosure.

3

Figure 1:
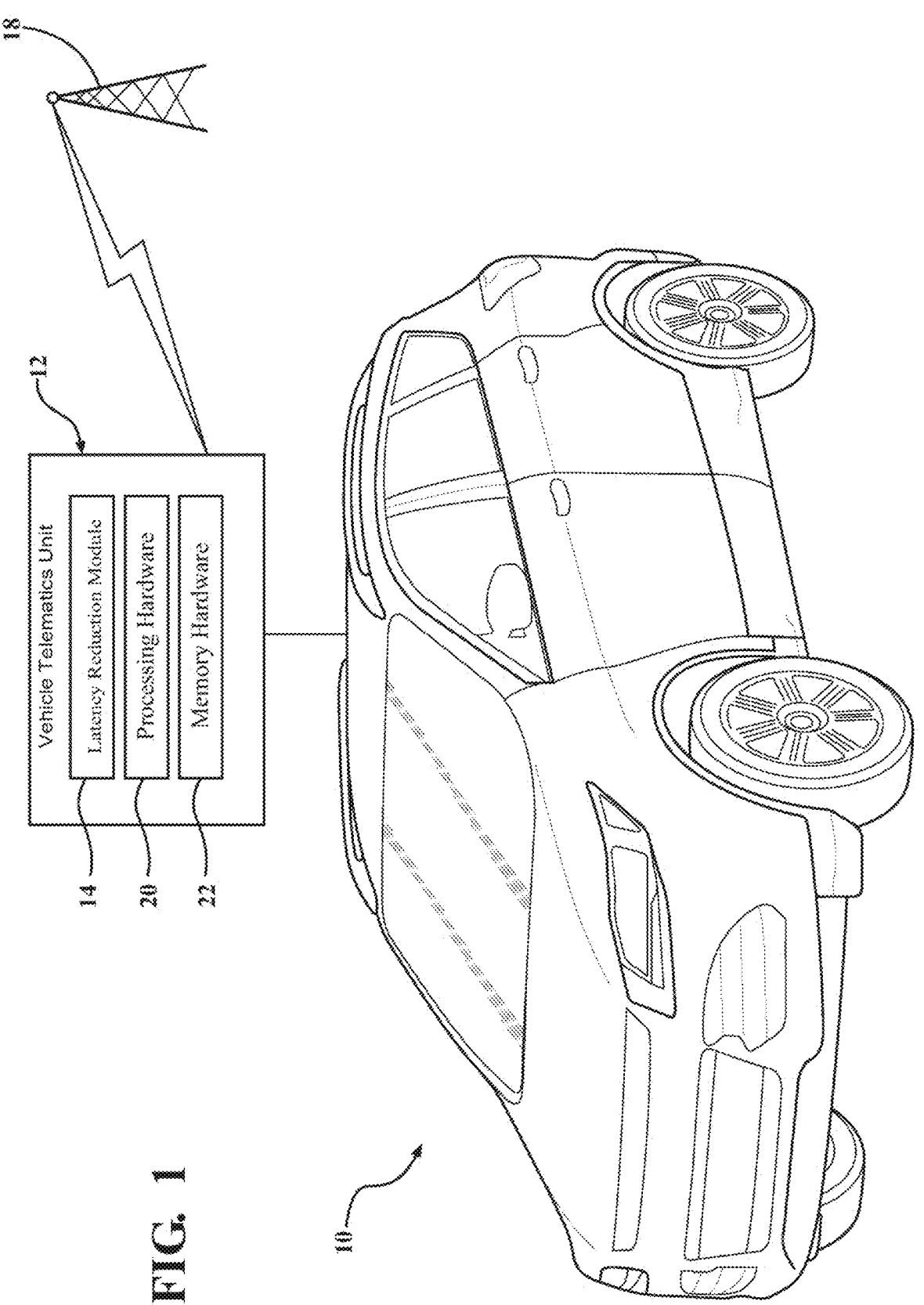
FIG. 1 is a perspective view of a vehicle including a telematics unit according to the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIGS. 1-4, a vehicle 10 including a telematics unit 12 having a latency reduction module 14 is provided. The vehicle 10, described below, is contemplated to be an electric vehicle (EV) and may include autonomous or semi-autonomous capabilities. Additionally or alternatively, the vehicle 10 may be a hybrid vehicle incorporating both EV and internal combustion engine (ICE) components and capabilities. Additionally, the vehicle 10 may include only an internal combustion engine or other power source, if desired.

Figure 2:
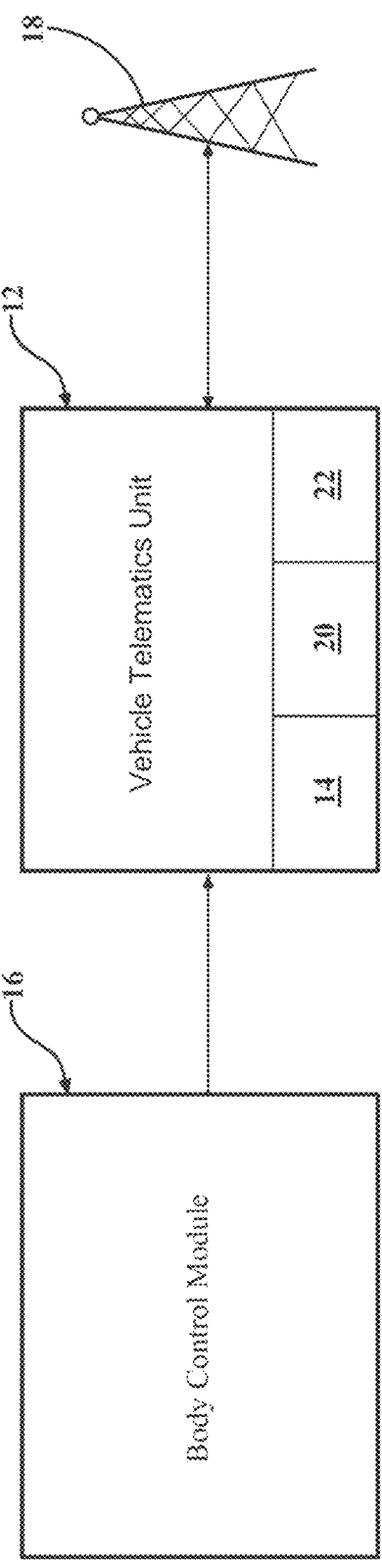
FIG. 2 is a functional block diagram showing the telematics unit of FIG. 1 in communication with a body control module and a cellular network.

With particular reference to FIG. 2, the telematics unit 12 is shown in communication with a body control module (BCM) 16 and a cellular tower 18. The telematics unit 12 includes processing hardware 20 and memory hardware 22 that respectively execute and store the latency reduction module 14. The BCM 16 is in communication with the telematics unit 12 and provides the latency reduction module 14 with information relating to the state of the vehicle 10. Specifically, the BCM 16 provides the telematics unit 12 and the latency reduction module 14 with information regarding the state of a vehicle ignition which, in turn, informs the telematics unit 12 and the latency reduction module 14 as to whether the vehicle 10 is in an ON state or an OFF state.

The ignition status generally pertains to whether the vehicle 10 is in the ON state or the OFF state. When the vehicle 10 is in the OFF state, no components of the vehicle 10 are active. When the vehicle 10 is in the ON state, the ignition has been activated by a user and at least essential components of the vehicle 10 are active. The ignition may be activated by physically pressing a button or turning a key. Alternatively, the ignition may be activated wirelessly through a user device such a cellular telephone or tablet (neither shown), Bluetooth®, and/or other components.

In some examples, the BCM 16 may provide vehicle data to the telematics unit 12 and the latency reduction module 14 including a time elapsed since last ignition status change. The time elapsed since last ignition status change generally pertains to a time that begins when the ignition status changes from one of an ON state or an OFF state to the other of the ON state and the OFF state. While the BCM 16 is described as providing this information to the telematics unit 12, the telematics unit 12 could alternatively store this information in the memory hardware 22.

The telematics unit 12 is in communication with a cellular network via the cellular tower 18. While a single cellular tower 18 is illustrated, the telematics unit 12 is capable of being in communication with one or more cellular towers 18 depending on the particular location of the vehicle 10. The telematics unit 12 is equipped with details of appropriate channels for receiving signals from the cellular network. In some examples, the channels include a dedicated control channel and a paging channel. The dedicated control channel is used to transmit information from a base station to the telematics unit 12 and vice versa, while the paging channel is used when specific information, such as a call or a text, is routed to the telematics unit 12. Additionally, in some examples, the telematics unit 12 is configured to monitor the paging channel at predefined time intervals called predetermined paging latency time intervals. In some cellular network examples, the predetermined paging latency time interval is 1.28 seconds.

The cellular network may be a Global System for Mobile Communications (GSM) network such as 5G, however, the cellular network may also be a Code Division Multiple Access (CDMA) network, a Time Division Multiple Access (TDMA), or other networks.

With further reference to FIGS. 1-4, the latency reduction module 14 of the telematics unit 12 is configured to change the predetermined paging latency time interval. More specifically, in some examples, the latency reduction module 14 is configured to change a first predetermined paging latency time interval to a second predetermined paging latency time interval, which is different than the first predetermined paging latency time interval. Moreover, the latency reduction module 14 may also be configured to change the second predetermined paging latency time interval back to the first predetermined paging latency time interval. Additionally, in some examples, the second predetermined paging latency time interval is shorter than the first predetermined paging latency time interval.

In some examples, the first predetermined paging latency time interval is approximately 1.28 seconds. Moreover, in some examples, the second predetermined paging latency time interval is less than approximately 1.28 seconds. Additionally, in some examples, the second predetermined paging latency time interval is less than approximately 1.00 seconds. Additionally, in some examples, the second predetermined paging latency time interval is less than approximately 0.75 seconds. Additionally, in some examples, the second predetermined paging latency time interval is less than approximately 0.5 seconds.

Referring still to FIGS. 1-4, the latency reduction module 14 is configured to change the first predetermined paging latency time interval to the second predetermined paging latency time interval based on the ignition status of the vehicle 10. More specifically, when the ignition moves from the OFF state to the ON state, the BCM 16 alerts the telematics unit 12 of the change. In response, the latency reduction module 14 is configured to change the first predetermined paging latency time interval to the second predetermined paging latency time interval. In some examples, when the ignition is returned to the OFF state from the ON state, the latency reduction module 14 is configured to change the second predetermined paging latency time interval to the first predetermined paging latency time interval. Additionally, it is contemplated that when the ignition state is changed, the latency reduction module 14 may wait a predetermined time period before changing from the first predetermined paging latency time interval to the second predetermined paging latency time interval, and vice versa.

The vehicle data may additionally include time elapsed since last ignition status change. The latency reduction module 14 is configured to switch between the first predetermined paging latency time interval and the second predetermined paging latency time interval based on the change in the ignition status and the time elapsed since the last ignition status change.

Figure 3:
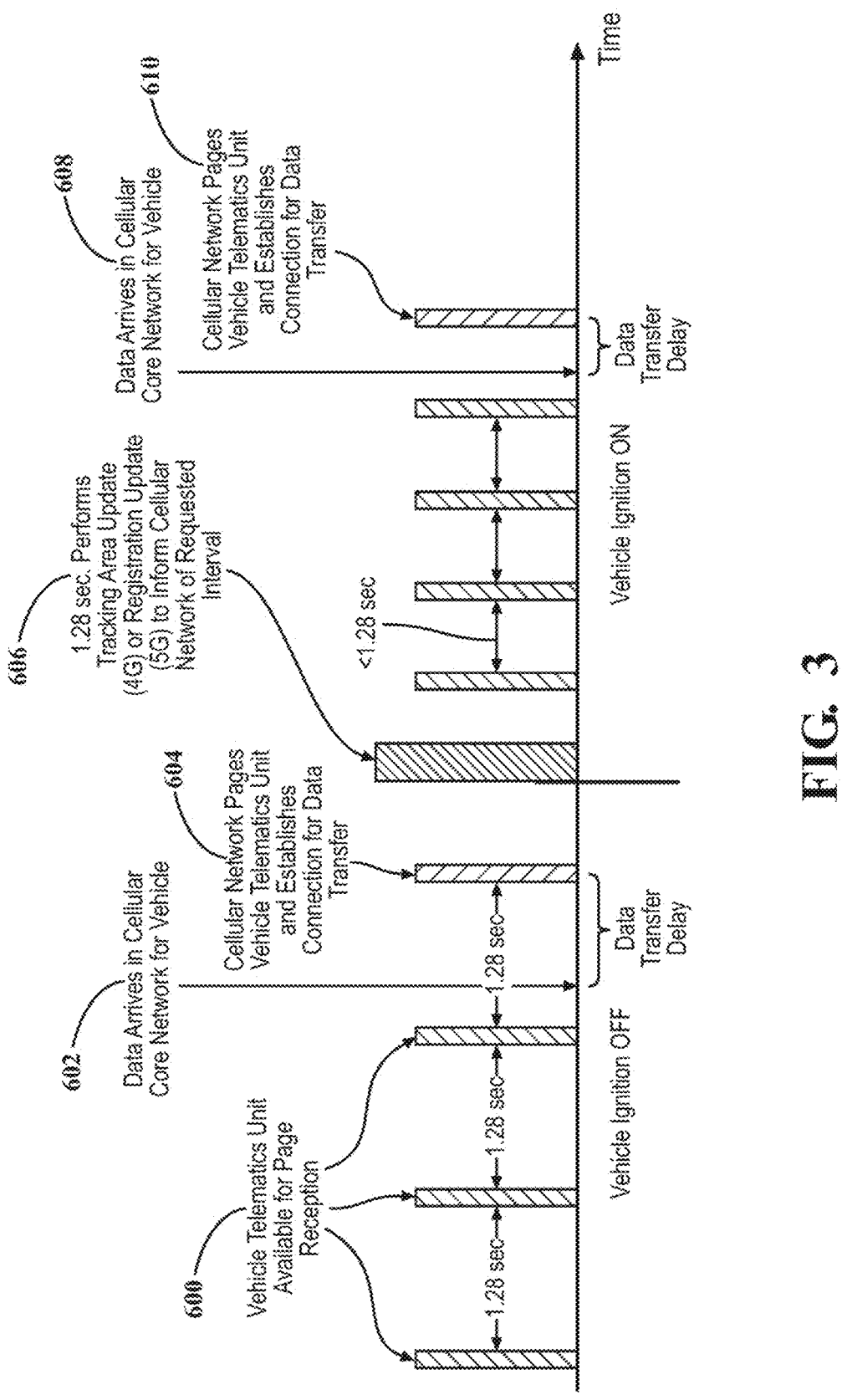
FIG. 3 is a timeline showing a vehicle telematics unit in communication with a cellular network.

Referring now to FIG. 3, an example timeline of the latency reduction system 100 is provided. In an initial step at 600, the ignition is in the OFF state and the latency time is set at the first predetermined paging latency of approximately 1.28 seconds. Accordingly, the telematics unit 12 is configured to monitor the paging channel every approximately 1.28 seconds. If data arrives between the predetermined paging latency intervals, such as at 602, the data is not received until the predetermined paging latency interval is over at 604, thus delaying receipt of the data. However, when the ignition is in the ON state, such as at 606, the latency reduction module 14 changes the first predetermined paging latency time interval to the second predetermined paging latency time interval, which is a shorter time interval than the first predetermined paging latency time interval. As such, when data arrives between the second predetermined paging latency intervals at 608, the delay in receipt of the data is shorter as compared to when the predetermined paging latency interval is set to the first predetermined paging latency time interval. As shown in FIG. 3, the time interval between when the data arrives at 608 and is received at 610 is reduced as compared to when the data arrives at 602 and is received at 604.

Figure 4:
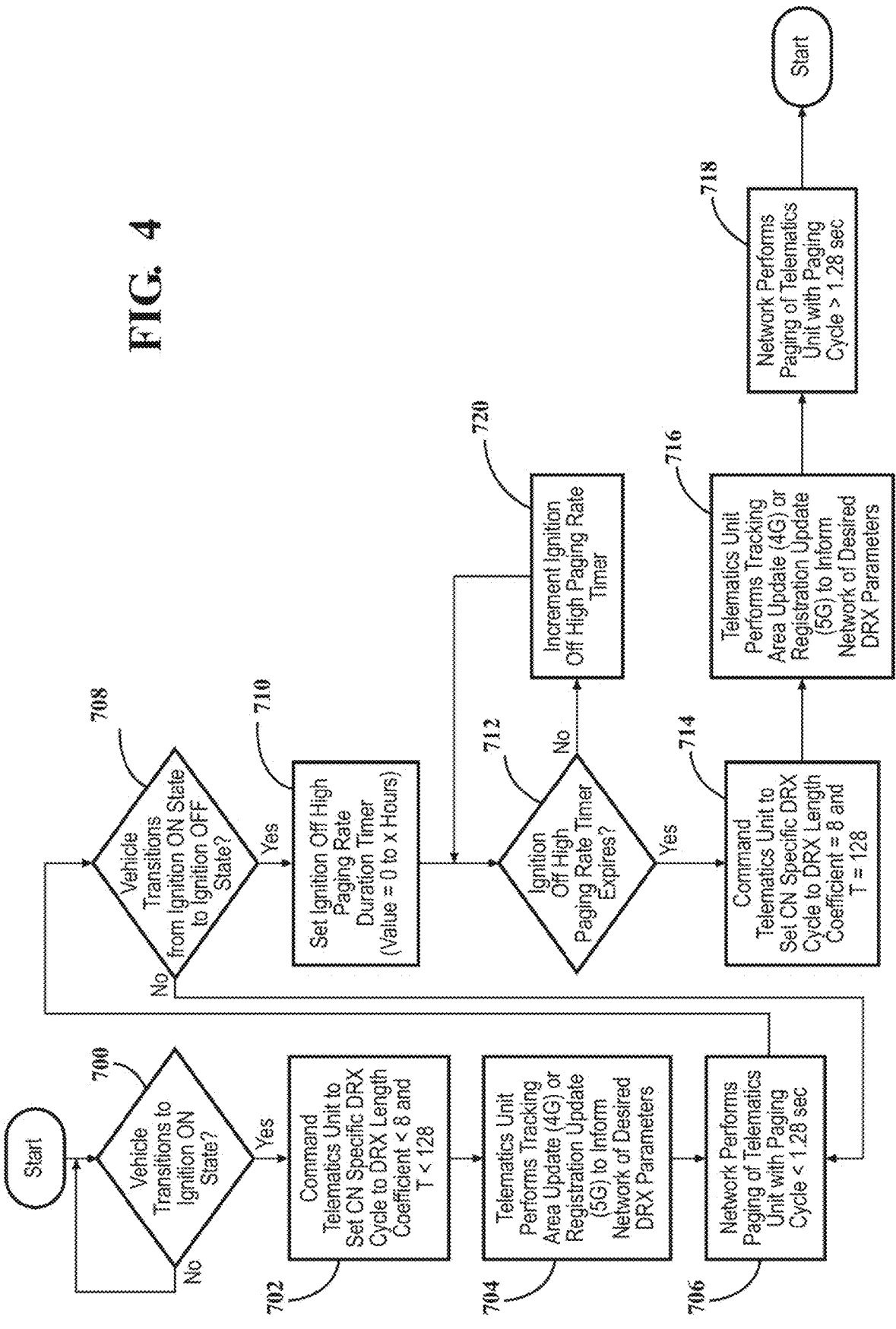
FIG. 4 is an example flow diagram of a latency reduction system according to the present disclosure.

Referring now to the example flow diagram illustrated in FIG. 4, in a first step at 700, the vehicle ignition transitions from the OFF state to the ON state. When the vehicle 10 is in the ON state, the latency reduction module 14 commands the vehicle telematics unit 12, at step 702, to change the predetermined latency time interval from the first predetermined paging latency time interval to the second predetermined paging latency time interval, which has a lower time interval than the first predetermined latency time interval. In some examples, the latency reduction module 14 may also command the vehicle telematics unit 12 to reduce a length coefficient such as a discontinuous reception cycle (DRX) length coefficient to a lower length as well. In some examples, the DRX length is approximately less than eight (8), although various other configurations have been contemplated. Next, in some examples, the vehicle telematics unit 12 must also be configured to inform the cellular network of the desired DRX length of the second predetermined latency time interval at step 704. Once that is completed, the vehicle telematics unit 12 monitors the paging channel at the second predetermined latency time interval at step 706 until the vehicle transitions from the ON state to the OFF state at step 708.

Once the vehicle is in the OFF state, the latency reduction module 14 may be configured to allow the vehicle telematics unit 12 to remain monitoring the paging channel at the second predetermined latency time interval for a predetermined time interval after the vehicle is in the OFF state at step 710. In some examples, the predetermined time interval may be from zero (0) to thirty (30) minutes or more. For example, the latency reduction module 14 may be configured to keep the monitoring of the paging channel at the second predetermined latency time interval after the vehicle 10 is in the OFF state to reduce delay to a user who desires to use the vehicle telematics unit 12 to perform vehicle operations such as locking/unlocking vehicle doors or remote starting the vehicle 10 during the predetermined time interval. As set forth in step 714, once the predetermined time interval has expired, the latency reduction module 14 commands the vehicle telematics unit 12 to return to the first predetermined latency time interval. Additionally, the vehicle telematics unit 12 is then configured to inform the cellular network of the desired DRX length and predetermined latency time intervals for the first predetermined latency time interval at step 716. As such, the user vehicle telematics unit 12 is then configured to monitor the paging channel at the first predetermined latency time interval at step 718.

As described, the latency reduction module 14 is configured to instruct the vehicle telematics module 12 to change the first predetermined paging latency time interval to the second predetermined paging latency time interval in an effort to reduce delays in sending and receiving information during vehicle operation. When the vehicle 10 is moved from the ON state to the OFF state, the latency reduction module 14 is configured to instruct the vehicle telematics module 12 to change the second predetermined paging latency time interval to the first predetermined paging latency time interval in an effort to reduce energy consumption of the vehicle 10.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A latency reduction system for a vehicle, the latency reduction system comprising:
 a latency reduction module;
 a body control module (BCM);
 a vehicle telematics module;
 wherein the latency reduction module receives vehicle data from the body control module (BCM) of the vehicle, the vehicle data including ignition status indicative of an ON state or an OFF state of the vehicle; and
 wherein the vehicle telematics module is communicatively coupled to the latency reduction module and includes memory hardware storing a first predetermined paging latency time interval corresponding to a default discontinuous reception (DRX) cycle broadcast by a cellular network and a second predetermined paging latency time interval, the second predetermined paging latency time interval shorter than the first predetermined paging latency time interval, and wherein the latency reduction module is configured to:
  instruct the vehicle telematics module to switch a monitoring interval of a cellular paging channel between the first predetermined paging latency time interval and the second predetermined paging latency time interval based on the ignition status changing to the ON state; and
  based on the ignition status changing to the OFF state, maintain the monitoring interval at the second predetermined paging latency time interval for a predetermined time period of less than thirty minutes and, subsequent to an expiration of the predetermined time period, instruct the vehicle telematics module to switch the monitoring interval to the first predetermined paging latency time interval.

2. The latency reduction system of claim 1, wherein the first predetermined paging latency time interval is approximately 1.28 seconds.

3. The latency reduction system of claim 1, wherein the second predetermined paging latency time interval is less than approximately 1.28 seconds.

4. The latency reduction system of claim 1, wherein the second predetermined paging latency time interval is less than approximately 1.0 seconds.

5. The latency reduction system of claim 1, wherein the second predetermined paging latency time interval is less than approximately 0.75 seconds.

6. A latency reduction system for a vehicle, the latency reduction system comprising:
 a latency reduction module;
 a body control module (BCM);
 a vehicle telematics module;
 wherein the latency reduction module receives vehicle data from the body control module (BCM) of the vehicle, the vehicle data including ignition status indicative of an ON state or an OFF state of the vehicle; and
 wherein the vehicle telematics module is communicatively coupled to the latency reduction module and includes memory hardware storing a first predetermined paging latency time interval corresponding to a default discontinuous reception (DRX) cycle broadcast by a cellular network and a second predetermined paging latency time interval, the second predetermined paging latency time interval shorter than the first predetermined paging latency time interval, and wherein the latency reduction module is configured to:
  switch a monitoring interval of a cellular paging channel from the first predetermined paging latency time interval to the second predetermined paging latency time interval when the ignition status changes from the OFF state to the ON state, wherein the vehicle telematics module is further configured to transmit the second predetermined paging latency time interval to the cellular network; and
  based on the ignition status changing from the ON state to the OFF state, maintain the monitoring interval at the second predetermined paging latency time interval for a predetermined time period of less than thirty minutes and, subsequent to an expiration of the predetermined time period, instruct the vehicle telematics module to switch the monitoring interval to the first predetermined paging latency time interval.

7. The latency reduction system of claim 6, wherein the first predetermined paging latency time interval is approximately 1.28 seconds or greater.

8. The latency reduction system of claim 6, wherein the second predetermined paging latency time interval is less than approximately 1.0 seconds.

9. The latency reduction system of claim 6, wherein the second predetermined paging latency time interval is less than approximately 0.75 seconds.

10. A vehicle incorporating the latency reduction system of claim 6.

11. A latency reduction system for a vehicle, the latency reduction system comprising:
 a latency reduction module;
 a body control module (BCM);
 a vehicle telematics module;
 wherein the latency reduction module receives vehicle data from the body control module (BCM) of the vehicle, the vehicle data including ignition status indicative of an ON state or an OFF state of the vehicle; and
 wherein the vehicle telematics module is communicatively coupled to the latency reduction module and includes memory hardware storing a first predetermined paging latency time interval corresponding to a default discontinuous reception (DRX) cycle broadcast by a cellular network and a second predetermined paging latency time interval, the second predetermined paging latency time interval shorter than the first predetermined paging latency time interval, and wherein the latency reduction module is configured to:

instruct the vehicle telematics module to switch a monitoring interval of a cellular paging channel between the first predetermined paging latency time interval and the second predetermined paging latency time interval based on the ignition status changing to the ON state; and based on the ignition status changing to the OFF state, maintain the monitoring interval at the second predetermined paging latency time interval for a predetermined time period of less than thirty minutes and, subsequent to an expiration of the predetermined time period, instruct the vehicle telematics module to switch the monitoring interval to the first predetermined paging latency time interval to reduce energy consumption of the vehicle.

12. The latency reduction system of claim 11, wherein the second predetermined paging latency time interval is less than approximately 1.28 seconds.

* * * * *